: US010445049B2

United States Patent
Li

(10) Patent No.: US 10,445,049 B2
(45) Date of Patent: Oct. 15, 2019

(54) MOBILE TERMINAL, COMBINED TERMINAL DEVICE AND METHOD FOR SPLICING CONTROL

(71) Applicants: ZHEJIANG GEELY HOLDING GROUP CO., LTD, Hangzhou (CN); Zhejiang Geely Automobile Research Institute Co., Ltd, Taizhou (CN)

(72) Inventor: Shufu Li, Hangzhou (CN)

(73) Assignees: ZHEJIANG GEELY HOLDING GROUP CO., LTD, Hangzhou (CN); Zhejiang Geely Automobile Research Institute Co., Ltd, Taizhou (CN)

( * ) Notice: Subject to any disclaimer, the term of this patent is extended or adjusted under 35 U.S.C. 154(b) by 30 days.

(21) Appl. No.: 15/545,562

(22) PCT Filed: Jan. 14, 2016

(86) PCT No.: PCT/CN2016/070879
§ 371 (c)(1),
(2) Date: Jul. 21, 2017

(87) PCT Pub. No.: WO2016/116000
PCT Pub. Date: Jul. 28, 2016

(65) Prior Publication Data
US 2018/0004474 A1  Jan. 4, 2018

(30) Foreign Application Priority Data

Jan. 23, 2015 (CN) .......................... 2015 1 0036188
Jan. 30, 2015 (CN) .......................... 2015 1 0050123
Feb. 12, 2015 (CN) .......................... 2015 1 0075047

(51) Int. Cl.
*G09G 5/00* (2006.01)
*G06F 3/14* (2006.01)
(Continued)

(52) U.S. Cl.
CPC ...... *G06F 3/1446* (2013.01); *H04M 1/72527* (2013.01); *G06F 3/04842* (2013.01);
(Continued)

(58) Field of Classification Search
CPC .. G06F 3/04842; G06F 3/041; G06F 19/3481; G06F 1/1626; G06F 1/163;
(Continued)

(56) References Cited

U.S. PATENT DOCUMENTS 5,963,268 A  10/1999  Ko
9,077,792 B1 * 7/2015  Alhaidar ............. H04M 1/0266
(Continued)

FOREIGN PATENT DOCUMENTS

CN    1118884    3/1996
CN    1896946    1/2007
(Continued)

OTHER PUBLICATIONS

TehRoflizer. "iPhone 25 Trailer (iPhone 5 Parody)—Youtube." [retrieved Dec. 13, 2017]. Retrieved from the Internet: <URL: https://www.youtube.com/watch?v=TfDiCpOfAG8>. (dated Sep. 21, 2012), 1 page.
(Continued)

*Primary Examiner* — Duc Q Dinh
(74) *Attorney, Agent, or Firm* — Alston & Bird LLP

(57) ABSTRACT

A mobile terminal (20), and in particular, a mobile terminal (20), a combined terminal device (30) and a method for splicing control of mobile terminals (20). For a splicable mobile terminal (20), according to a state determination instruction, the mobile terminal (20) is caused to selectively enter a master operating state or a slave operating state; when the mobile terminal (20) operates as a master, a display partitioning unit (a2) partitions the display content of the master according to the display screen resource of individual
(Continued)

mobile terminals (20) in a combined terminal device (30), to obtain a plurality of pieces of partitioned display data corresponding to a plurality of the mobile terminals (20) in the combined terminal device (30), and sends corresponding partitioned display data to slaves; and in a case in which the mobile terminal (20) acts as a slave, upon reception of the partitioned display data from the master, a display switching unit (a3) displays the received partitioned display data. The content displayed by the master can be displayed by the slaves, and when there are a large number of slaves, the content can be displayed to a user on a relatively large screen composed of a plurality of slaves, satisfying people's demand for a large display area.

28 Claims, 9 Drawing Sheets

(51) Int. Cl.
| | | |
|---|---|---|
| *H04M 1/725* | (2006.01) | |
| *G06F 3/0484* | (2013.01) | |
| *G06F 3/0488* | (2013.01) | |
| *H04R 5/02* | (2006.01) | |
| *H04R 5/04* | (2006.01) | |
| *H04W 72/04* | (2009.01) | |

(52) U.S. Cl.
CPC .......... *G06F 3/04886* (2013.01); *G06F 2203/04803* (2013.01); *H04M 1/72569* (2013.01); *H04M 2201/38* (2013.01); *H04M 2201/42* (2013.01); *H04R 5/02* (2013.01); *H04R 5/04* (2013.01); *H04W 72/048* (2013.01)

(58) Field of Classification Search
CPC .......... G06F 1/266; G06F 2203/04102; G06F 3/0346; G06F 3/04886; G06F 3/1446; G06F 3/0482; G06F 3/1423; G06F 3/0488; G06F 1/1654; G06F 2203/04803; G06F 1/1616; G06F 1/1647; G06F 1/1677; H04N 21/4307; H04N 21/42224; H04N 21/252; H04N 5/073; H04N 2201/0094; H04N 2201/3253; H04N 2201/3273; G09G 2300/026; G09G 2370/08; G09G 2310/0221; G09G 2320/08
USPC .................................................... 345/1.1–2.3
See application file for complete search history.

(56) References Cited

U.S. PATENT DOCUMENTS

| | | | |
|---|---|---|---|
| 9,727,298 B2* | 8/2017 | Naruse .................. | G06F 3/1423 |
| 2003/0137802 A1 | 7/2003 | Von Novak | |
| 2007/0164923 A1 | 7/2007 | Kanai et al. | |
| 2008/0216125 A1 | 9/2008 | Li et al. | |
| 2009/0189829 A1 | 7/2009 | Hiramatsu et al. | |
| 2010/0039350 A1* | 2/2010 | Wakefield ............. | G06F 1/1616 345/1.3 |
| 2012/0062475 A1* | 3/2012 | Locker .................... | G06F 3/041 345/173 |
| 2012/0120566 A1 | 5/2012 | Miao et al. | |
| 2015/0373483 A1 | 12/2015 | Verma et al. | |

FOREIGN PATENT DOCUMENTS

| | | |
|---|---|---|
| CN | 101605155 | 12/2009 |
| CN | 101674364 | 3/2010 |
| CN | 201550146 | 8/2010 |
| CN | 102375487 | 3/2012 |
| CN | 102567300 | 7/2012 |
| CN | 102792352 | 11/2012 |
| CN | 102855114 | 1/2013 |
| CN | 103209232 | 7/2013 |
| CN | 103366715 | 10/2013 |
| CN | 103488251 | 1/2014 |
| CN | 103559090 | 2/2014 |
| CN | 103701966 | 4/2014 |
| CN | 104216675 | 12/2014 |
| CN | 104320503 | 1/2015 |
| CN | 104679470 | 6/2015 |
| CN | 104714613 | 6/2015 |
| CN | 104717330 | 6/2015 |
| CN | 204462946 | 7/2015 |
| CN | 104853017 | 8/2015 |
| EP | 1715550 | 10/2006 |
| EP | 2720446 | 4/2014 |
| WO | WO-2010019178 | 2/2010 |

OTHER PUBLICATIONS

Aflalo, Marc. "Apple Rumored to be Working on Bezelless iPhone." [retrieved Dec. 23, 2017]. Retrieved from the Internet: <URL: http://aflalo.com/2013/11/apple-rumored-to-be-working-on-bezel-less-iphone/>. (dated Nov. 12, 2013), 2 pages.
Office Action for U.S. Appl. No. 15/545,535 dated Jan. 2, 2018, 12 pages.
Extended European Search Report for European Patent Application No. 16739746.2 dated Dec. 20, 2017, 4 pages.
Office Action for European Patent Application No. 16 739 746.2 dated Jan. 5, 2018, 7 pages.
MANGOFISH. "Samsung Applies for a Patent for a Cellphone Equipped with a 21:9 Ultra-Long Screen", TENCENT DIGITAL, Mar. 16, 2014 (Mar. 16, 2014), pp. 1-2.
International Search Report and Written Opinion of the International Search Authority for International Patent Application No. PCT/CN2016/070878, dated Mar. 25, 2016, with English translation of the Search Report, 12 pages.
International Search Report and Written Opinion of the International Search Authority for Interntional Patent Application No. PCT/CN2016/070879, dated Mar. 24, 2016, with English translation of the Search Report, 11 pages.
International Search Report and Written Opinion of the International Search Authority for International Patent Application No. PCT/CN2016/070880, dated Apr. 19, 2016, with English translation of the Search Report, 11 pages.

* cited by examiner

MOBILE TERMINAL, COMBINED TERMINAL DEVICE AND METHOD FOR SPLICING CONTROL

FIELD OF THE INVENTION

The invention relates to a mobile terminal, and in particular, to a mobile terminal, a combined terminal device formed by splicing a plurality of mobile terminals and a method for splicing control of mobile terminals.

BACKGROUND OF THE INVENTION

In the prior art, the aspect ratio of the display screen of a mobile phone is generally locked to be 16:9 or 16:10. To be able to implement a one-hand touch operation on a display screen as much as possible, the area of the display screen at this point is generally very small, for example, the display screen is of 3.5 inches, which is far from meeting people's demand for large display area. However, when the display area of a display screen is arranged to be sufficiently large, for example, a display screen of 5.5 inches, at this point, due to the above mentioned limitation of the aspect ratio, the width of the display screen is too large, for which a one-hand operation can already not be performed generally.

Moreover, for a display screen designed according to the aforementioned aspect ratio, when it displays published documents mostly of the size of a sheet of A4 paper, black borders will generally be left at the periphery of the display screen, which not only affects the display effect, but also does not realize the maximum utilization of the display screen.

In addition, since the update and upgrade of mobile phones is very fast, the frequency at which a user of a mobile phone changes the mobile phone is also faster and faster. Discard of old mobile phones will cause serious waste of resources and environmental pollution. Nowadays, there are yet no good solutions on the market, and the approach of recycling mobile phones is generally adopted. Thus, not only will the cost of regeneration of worn-out mobile phones become high, but also secondary pollution in recycling and regeneration will result.

SUMMARY OF THE INVENTION

Upon recognizing the above described prior art, the inventor of this application realizes that the above mentioned several problems existing in the prior art which look irrelevant to each other may be solved in a unified way by designing a mobile terminal with a specific structure.

According to an aspect of the invention, there is provided a splicable mobile terminal, a plurality of the mobile terminals being capable of being spliced to be combined into a single combined terminal device, wherein each of the mobile terminals can selectively operate as a master in a master operating state and operate as a slave in a slave operating state, each of the mobile terminals comprises a display screen and a splicing management module, which splicing management module comprises:

a state determination unit configured to cause the mobile terminal to selectively enter the master operating state or the slave operating state according to a state determination instruction;

a display partitioning unit configured to, when the mobile terminal operates as the master, partition the display content of the master according to the display screen resource of individual said mobile terminals in the combined terminal device, to obtain a plurality of pieces of partitioned display data corresponding to the plurality of the mobile terminals in the combined terminal device, and send corresponding said partitioned display data to the slaves; and a display switching unit configured to, in a case in which the mobile terminal acts as the slave, upon reception of the partitioned display data from the master, hide the current work task of the mobile terminal in the background for running, and display the received partitioned display data.

Preferably, the splicing management module further comprises:

a resource statistics unit configured to perform statistics on currently available resource information of the mobile terminal and send the available resource information to the master, in a case in which the mobile terminal acts as the slave;

a resource allocation unit configured to partition the current work task of the master into a plurality of sub-tasks according to the available resource information of the slaves and send corresponding sub-tasks to the slaves, in a case in which the mobile terminal operates as the master; and a sub-task execution unit configured to execute the sub-task using the available resource according to the sub-task from the master, in a case in which the mobile terminal acts as the slave.

Preferably, the mobile terminal further comprises a state selection interface for receiving the state determination instruction inputted by a user.

Preferably, the mobile terminal further comprises a splicing detection module configured to continuously monitor whether the mobile terminal enters a splicing state, wherein the state selection interface is configured to be triggered to be presented to the user on the display screen of the mobile terminal in response to the mobile terminal entering the splicing state.

Preferably, the mobile terminal further comprises one or more physical keys, each of which is used for implementing a predetermined function; and a function switching module configured to switch the predetermined function of one specified physical key of the one or more physical keys into an invocation function for invoking the state selection interface, and present on the display screen a virtual key for implementing the predetermined function of the specified physical key, wherein when the specified physical key is pressed, the state selection interface is triggered to be presented to the user on the display screen of the mobile terminal in response to the pressing operation.

Preferably, the mobile terminal further comprises a splicing interface for being spliced with other said mobile terminals for data communication between individual said mobile terminals.

Preferably, the state determination unit is further configured to, when the mobile terminal enters the master operating state in response to the state determination instruction indicative of entering the master operating state, send out the state determination instruction indicative of entering the slave operating state to other mobile terminals.

Preferably, the display partitioning unit is further configured to be triggered to run in response to the mobile terminal entering the master operating state.

Preferably, the state determination unit is further configured to cause the mobile terminal to exit the master operating state according to the state determination instruction, and send out a slave termination instruction indicative of exiting the slave operating state to other mobile terminal: in response to the mobile terminal exiting the master operating state.

Preferably, the state determination unit is further configured to, in a case in which the mobile terminal acts as the slave, when the mobile terminal loses the connection with the master and is in a lost state, send out the slave termination instruction indicative of exiting the slave operating state according to and in response to the lost state.

Preferably, the display partitioning unit monitors the display screen resource of individual said mobile terminals in the combined terminal device in real time, and partitions the display content of the master in real time according to the monitored display screen resource.

Preferably, the display switching unit is further configured to, in a case in which the mobile terminal acts as the slave, when receiving the slave termination instruction, terminate displaying the partitioned display data, and restore a background running task of the mobile terminal to the foreground for running.

Preferably, the sub-task execution unit is further configured to, in a case in which the mobile terminal acts as the slave, when receiving the slave termination instruction, terminate executing the sub-task.

Preferably, the available resource information comprises at least one of the CPU resource, the storage resource, the network resource and the electricity resource.

Preferably, the resource allocation unit in the master partitions the computational task of the master into computational sub-tasks, and sends a corresponding computational sub-task to the slave according to the CPU resource of the slave, and the sub-task execution unit in the slave uses the CPU resource of the slave to execute the computational sub-task according to the received computational sub-task; or the resource allocation unit in the master partitions the storage task of the master into storage sub-tasks, and sends a corresponding storage sub-task to the slave according to the storage resource of the slave, and the sub-task execution unit in the slave uses the storage resource of the slave to execute the storage sub-task according to the received storage sub-task; or the resource allocation unit in the master partitions the upload or download task of the master into upload or download sub-tasks, and sends a corresponding upload or download sub-task to the slave according to the network resource of the slave, and the sub-task execution unit in the slave uses the network resource of the slave to execute the upload or download sub-task according to the received upload or download sub-task; or the master obtains the electricity resource of the slaves, and if the electricity of the master or a certain said slave is insufficient, the master generates a charging task, and the master allocates the charging task to one said slave or the master with sufficient electricity, such that the slave or the master with sufficient electricity charges the master or the slave with insufficient electricity, or the resource allocation unit of the master partitions the charging task into charging sub-tasks and sends a corresponding charging sub-task to other said slave or the master according to the electricity resource, and according to the received charging sub-task, the sub-task execution unit in the slave or the master uses the charging resource in the slave or the master to charge the master or the slave with insufficient electricity.

Preferably, the resource statistics unit performs statistics on speakers that the master and the slaves have, the resource allocation unit allocates the left channel of the audio of the combined terminal device to individual said speakers located on the left side, allocates the right channel of the audio to individual said speakers located on the right side, and allocates the middle channel of the audio to individual said speakers in the middle, to form a stereo speaker system.

Preferably, the mobile terminal further comprises a master query module configured to, in a case in which the mobile terminal is in the splicing state, determine via query whether there is said mobile terminal that operates as the master in the combined terminal device; and when there is said mobile terminal that operates as the master in the combined terminal device, the master query module sends to the state determination unit the state determination instruction indicative of arranging said mobile terminal to be the slave.

Preferably, the mobile terminal further comprises:

a first side surface and a second side surface located on two opposite sides of the display screen, wherein the first and second side surfaces are planes parallel to each other;

a first magnetic adsorption element arranged at the first side surface and a second magnetic adsorption element arranged at the second side surface; wherein the positions of the first and second magnetic adsorption elements are arranged such that when a further said mobile terminal is spliced with the current said mobile terminal, the first magnetic adsorption element at the first side surface of the current said mobile terminal and the second magnetic adsorption element at the second side surface of the further said mobile terminal can attract each other, such that the first side surface of the current said mobile terminal is attached to the second side surface of the further said mobile terminal in alignment with each other. Further preferably, the first magnetic adsorption element does not protrude from the first side surface, and the second magnetic adsorption element does not protrude from the second side surface.

Preferably, the splicing interface further comprises:

a first conductive contact arranged at the first side surface, and a second conductive contact arranged at the second side surface;

the positions of the first and second conductive contacts are arranged such that when the first side surface of the current said mobile terminal is attached to the second side surface of the further said mobile terminal in alignment with each other, the first conductive contact at the first side surface of the current said mobile terminal and the second conductive contact at the second side surface of the further said mobile terminal can electrically contact each other.

Preferably, at least one of the first conductive contact and the second conductive contact is made of elastic material or is biased by a spring, such that it can be moved in a direction perpendicular to the side surface where it is located.

Preferably, the first conductive contact consists of a plurality of arcuate metal sheets, and the second conductive contact is recessed into the second side surface; and the first conductive contact of the current said mobile terminal and the second conductive contact of the further said mobile terminal abut each other, in order that by the first conductive contact deforming in the direction perpendicular to the side surface where it is located, the second side surface of the further said mobile terminal is caused to be attached to the first side surface of the current said mobile terminal in alignment with each other. Or, preferably, the first side surface has a first groove, and the first conductive contact is rotatably connected into the first groove; and the first conductive contact may be rotated out of the first groove to contact the second conductive contact of the further said mobile terminal, and the first conductive contact may be rotated into the first groove to disconnect the contact with the second conductive contact of the further said mobile terminal.

Preferably, at least one of the first conductive contact and the second conductive contact is formed as a movable contact which may be moved between an extended position and a retracted position; wherein when at the extended position, the movable contact protrudes from the side surface where it is located. Preferably, the side surface where the movable contact is located has a recessed portion for accommodating the movable contact.

Preferably, the mobile terminal further comprises:

a removable contact cover for closing the recessed portion;

wherein when the contact cover closes the recessed portion, the contact cover is flush with the side surface where it is located.

Preferably, the mobile terminal further comprises:

a manual operation key arranged at the first side surface and/or the second side surface, wherein the manual operation key is formed in a second groove of the side surface where it is located, such that the contour of the manual operation key does not exceed the side surface where it is located.

Preferably, the mobile terminal is a rectangle without rounded corners on the whole.

Preferably, the display screen is basically rectangular and arranged such that $L:W \geq 2.5$, wherein L is the length of the display screen and W is the width of the display screen.

Preferably, $L:W=(205\sim215):[(290\sim304)/n]$, wherein n is a positive integer and $n \geq 4$.

Preferably, $n \leq 6$. Further preferably, n is 4 or 5.

Preferably, 150 mm$\geq$W$\geq$30 mm. Optionally, 90 mm$\geq$W$\geq$50 mm.

Preferably, L is 205~215 mm.

Preferably, W is 58~61 mm. Optionally, W is 60 mm, and L is 210 mm.

Preferably, W is 72~76 mm. Optionally, W is 74 mm, and L is 210 mm.

Preferably, the display screen is basically rectangular and arranged such that $L:W=(205\sim215):[(290\sim304)/n]$, wherein L is the length of the display screen, W is the width of the display screen, and n is a positive integer and $n \geq 2$. Further preferably, n is 2 or 3.

Preferably, L is 205~215 mm.

Preferably, in the width direction of the display screen, two oppositely arranged sides of the mobile terminal are arranged in a form of no bezel or a narrow bezel, wherein the width of the narrow bezel is less than 1 mm.

Preferably, in the length direction of the display screen, at least one of two oppositely arranged sides of the mobile terminal is arranged in the form of no bezel or a narrow bezel.

Preferably, the display content comprises a virtual input device, and the display partitioning unit is further configured to partition the display data corresponding to the virtual input device into at least one piece of partitioned display data on the whole.

According to another aspect of the invention, there is provided a combined terminal device, which is formed by splicing N said mobile terminals in the width direction and/or the length direction of the display screen, and is such that the display screens of the N mobile terminals form a single rectangular screen as a whole to be used as the display screen of the combined terminal device.

The invention further provides a combined terminal device, which is formed by splicing N said mobile terminals in the width direction and/or the length direction of the display screen, and is such that the display screens of M of the mobile terminals form a single rectangular screen as a whole to be used as the display screen of the combined terminal device, the display screens of N−M of the mobile terminals form a single rectangular screen as a whole to act as an input screen for displaying the virtual input device, and the input screen is used for providing a virtual keyboard and a virtual touchpad acting as input interfaces of the combined terminal device, wherein N>M.

Preferably, the mobile terminals used as the display screen of the combined terminal device and the mobile terminals used as the input screen of the combined terminal device are connected via wired or wireless communications.

According to still another aspect of the invention, there is provided a method for splicing control of mobile terminals, which is used for controlling splicing of a plurality of mobile terminals to be combined into a single combined terminal device, wherein each of the mobile terminals can selectively operate as a master in a master operating state and operate as a slave in a slave operating state, the method comprising:

mutually splicing the plurality of mobile terminals via respective splicing interfaces for data communications to constitute the combined terminal device;

causing the current said mobile terminal to selectively enter the master operating state or the slave operating state according to a state determination instruction inputted by a user or from other mobile terminal in the combined terminal device;

partitioning the display content of the master by the master according to the display screen resource of individual said mobile terminals in the combined terminal device, to obtain a plurality of pieces of partitioned display data corresponding to the plurality of the mobile terminals in the combined terminal device, and sending corresponding said partitioned display data to the slaves; and upon reception of the partitioned display data from the master, the slaves hiding the current work tasks of the mobile terminals in the background for running, and displaying the received partitioned display data.

Preferably, the method for splicing control further comprises: the slaves performing statistics on currently available resource information thereof and sending the available resource information to the master;

the master partitioning the current work task of the master into a plurality of sub-tasks according to the available resource information of the slaves and sending corresponding sub-tasks to the slaves; and the slaves executing the sub-tasks using the available resources according to the sub-tasks from the master.

Preferably, the method for splicing control further comprises the mobile terminal continuously monitoring whether the mobile terminal enters a splicing state; and triggering presenting a state selection interface to the user on the display screen of the mobile terminal in response to the mobile terminal entering the splicing state, via which state selection interface the user can input the state determination instruction.

Preferably, when the mobile terminal enters the master operating state in response to the state determination instruction indicative of entering the master operating state, the master sends out the state determination instruction indicative of entering the slave operating state to other mobile terminals, such that the other mobile terminals enter the slave operating state.

Preferably, the step of the master partitioning its display content is triggered to be run in response to the mobile terminal entering the master operating state.

Preferably, the mobile terminal is caused to exit the master operating state according to the state determination instruction inputted by the user, and in response to the mobile terminal exiting the master operating state, a slave termination instruction indicative of exiting the slave operating state is sent out to other mobile terminals.

Preferably, when receiving the slave termination instruction, the slave terminates displaying the partitioned display data, and restores a background running task of the slave to the foreground for running.

Preferably, when receiving the slave termination instruction, the slave terminates executing the sub-task.

Preferably, the available resource information comprises at least one of the CPU resource, the storage resource, the network resource and the electricity resource.

Preferably, when the mobile terminal enters the splicing state, the mobile terminal determines via query whether there is a mobile terminal that operates as the master in the combined terminal device; and the mobile terminal enters the slave operating state when there is a mobile terminal that operates as the master in the combined terminal device.

It can be seen from the technical solutions of the mobile terminal and the method for splicing control that the mobile terminals involved in the invention all can be transformed between the master operating state and the slave operating state. When a mobile terminal is spliced with a further mobile terminal, or when a mobile terminal is spliced into a combined terminal device, the state determination unit can select to act as the master or a slave according to a state determination instruction: when as the master, the display partitioning unit partitions the display content of the master and generates a plurality of pieces of partitioned display data and sends corresponding said partitioned display data to slaves; and when as a slave, upon the reception of the partitioned display data, the display switching unit hides the current work task of the mobile terminal in the background for running, and displays the received partitioned display data. As such, the content displayed by the master can be displayed by slaves very conveniently, and when there are a large number of slaves, the content can be displayed to the user with a relatively large screen composed of a plurality of slaves, satisfying people's demand for a large display area.

Moreover, the mobile terminals involved in the invention can be spliced with each other to form a combined terminal device, and thus, the display screen of a mobile terminal may be arranged with a width suitable for a one-hand operation, and then a combined terminal device is formed by splicing. Since the mobile terminal can be spliced, by setting the appropriate size and the number of mobile terminals to be spliced, the display screen of the combined terminal device formed by splicing can be made to be of the ratio of a sheet of A4 paper, and the display screen of such a combined terminal device can eliminate black borders when displaying a published document. What's more, when old mobile terminals in conformity with the technical solutions of the invention are spliced to form a combined terminal device, the problem of secondary pollution in recycling and regeneration of old mobile terminals can also be solved.

In addition, according to the technical solutions of the invention, two opposite sides of the display screen of a mobile terminal involved in the invention, for example, the left and right sides or the upper and lower sides, have a first magnetic adsorption element and a second magnetic adsorption element which can attract each other. The first magnetic adsorption element/the second magnetic adsorption element of such a mobile terminal and the second magnetic adsorption element/the first magnetic adsorption element of other mobile terminal can attract each other, to form a state in which the mobile terminals are spliced with each other.

Because of the first magnetic adsorption element and the second magnetic adsorption element, a dedicated slot for splicing does not need to be arranged on a mobile terminal, which thus can maintain the hand feeling of using the mobile terminal. Furthermore, the first side surface and the second side surface of the display screen are parallel to each other, and therefore a mobile terminal can be attached to other mobile terminal on the side surface, and the screen of the combined terminal device composed of a plurality of mobile terminals is in one and the same horizontal plane, which improves the display effect and the viewing experience.

Furthermore, it can be seen from the above description of the technical solutions of the invention that in a technical solution of the invention, as compared to a display screen in the prior art of a display ratio of 16:9 or 16:10 (i.e., an aspect ratio of 1.78 or 1.6), the invention sets the aspect ratio of a display screen to be at least 2.5. Therefore, the display screen of the invention is more elongated in shape. Thus, with the same width, the display screen of the invention has a larger display area. Or, in other words, with the same display area, the display screen of the invention may have a smaller width to facilitate a one-hand operation by people.

Moreover, by significantly elongating a display screen as compared to the prior art, it may be surprisingly found that, while for such a display screen, it is easy for a user of a mobile phone to operate by one hand, a corresponding ratio of a sheet of A4 paper is easier to realize by a plurality of display screens in a single row splicing manner, though the invention is not limited to single row splicing. What's more, it may be conceived that when a certain user retains a plurality of mobile phones with such a display screen due to the update and upgrade of mobile phones, he may splice these mobile phones to form a combined terminal device.

It may be appreciated that when a mobile phone with a display screen according to the invention is eliminated by a user, it may be due to other causes unrelated to the display screen, for example, the CPU or lack of storage space. Yet, such a display screen with a specific aspect ratio proposed by the invention just provides a corresponding use value for an old mobile phone that is eliminated, because when a plurality of mobile phones including the old mobile phone are spliced into a combined terminal device, what is primarily made use of by it is the display function of the display screen of the old mobile phone, and other capabilities of the combined terminal device may be provided by a new mobile phone with better performances in the combined terminal device.

In particular, a primary function of a display screen is to provide document reading for a user, and when a suitable number of mobile terminals are spliced, such that the display screen of a combined terminal device is substantially of the ratio of a sheet of A4 paper, the problem of black borders appearing when displaying a published document with the A4 ratio may be substantially eliminated. This is convenient for a user to read a document with the A4 ratio on the spliced display screens, and is more significant for promotion of the use value of an old mobile phone.

The above and other objectives, advantages and features of the invention may be more apparent to those skilled in the art from the following detailed description of specific embodiments of the invention in connection with the drawings.

BRIEF DESCRIPTION OF THE DRAWINGS

In the following, some specific embodiments of the invention will be described in detail with reference to the drawings in an exemplary and non-limiting manner. In the drawings, like reference signs denote like or similar components or parts. It shall be appreciated by those skilled in the art that these drawings are not necessarily drawn to scale. In the drawings.

DETAILED DESCRIPTION OF THE INVENTION

Figure 1:
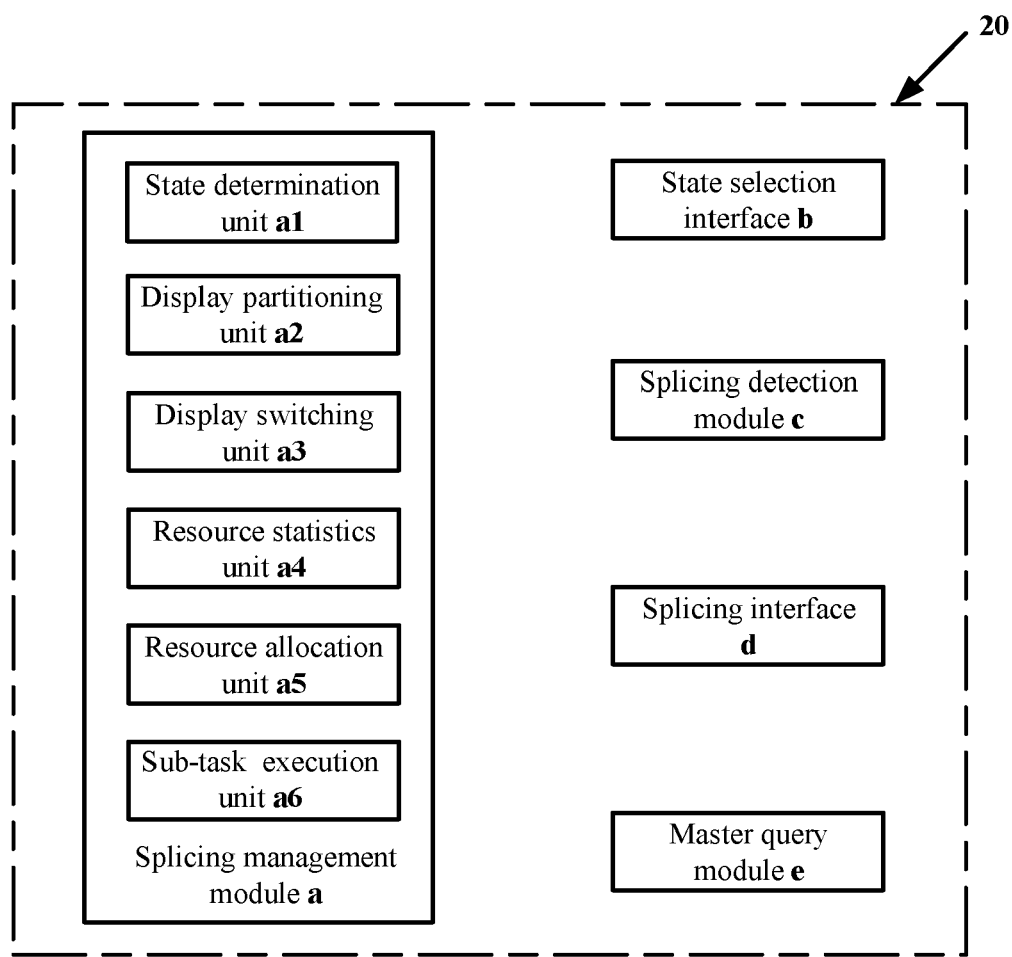
FIG. 1 is a system diagram of a mobile terminal according to an embodiment of the invention.

In the invention, a plurality of mobile terminals 20 can be spliced to be combined into a single combined terminal device 30, wherein each of the mobile terminals 20 can selectively operate as a master in a master operating state and operate as a slave in a slave operating state. As shown in FIG. 1, each of the mobile terminals 20 has a splicing management module a, and the splicing management module a comprises a state determination unit a1, a display partitioning unit a2 and a display switching unit a3, wherein the state determination unit a1 is configured to cause the mobile terminal 20 to selectively enter the master operating state or the slave operating state according to a state determination instruction generated, for example, by manual clicking, the display partitioning unit is configured to partition the display content of the master according to the display screen resource represented as the number of display screens of the individual mobile terminals 20 in the combined terminal device 30, to obtain a plurality of pieces of partitioned display data corresponding to the plurality of mobile terminals 20 in the combined terminal device 30 and send corresponding partitioned display data to slaves, when the mobile terminal 20 operates as the master, and the display switching unit is configured to, in a case in which the mobile terminal 20 acts as the slave, upon reception of the partitioned display data from the master, hide the current work task of the mobile terminal 20 in the background for running, and display the received partitioned display data. The display content comprises a virtual input device, and the display partitioning unit partitions the display data corresponding to the virtual input device into at least one piece of partitioned display data on the whole, and sends it to mobile terminals 20. In an embodiment, the mobile terminal 20 for displaying the virtual input device displays only the virtual input device.

In a preferred embodiment, the splicing management module a further comprises a resource statistics unit a4, a resource allocation unit a5 and a sub-task execution unit a6. The resource statistics unit a4 is configured to perform statistics on currently available resource information of the mobile terminal 20 and send the available resource information to the master, in a case in which the mobile terminal 20 acts as a slave. The resource allocation unit a5 is configured to partition the current work task of the master into a plurality of sub-tasks according to the available resource information of the slaves and send corresponding sub-tasks to the slaves, in a case in which the mobile terminal 20 operates as the master. The sub-task execution unit a6 is configured to, according to the sub-task from the master, execute the sub-task using the available resource, in a case in which the mobile terminal 20 acts as a slave. The available resource information comprises the CPU resource, the storage resource, the network resource and the electricity resource of individual mobile terminals 20 on which statistics is performed. For example, the network resource may be the upload bandwidth and the download bandwidth, the CPU resource may be the remaining computational capabilities of a CPU except when the background tasks are kept running, the storage resource may be the capacity of available hard disks of the individual mobile terminals 20, and the electricity resource may be the remaining electricity after a set task is run in a set time. Through the first conductive contact and the second conductive contact described hereinafter, the individual mobile terminals 20 can share the available resources.

In an embodiment of the invention, the mobile terminal 20 further comprises a state selection interface (window, menu) for receiving a state determination instruction inputted by a user. In another embodiment, the mobile terminal 20 comprises a splicing detection module, which continuously monitors whether the mobile terminal 20 enters a splicing state; when it is monitored that the mobile terminal 20 enters the splicing state, the state selection interface is triggered to be presented to the user on the display screen 10 of the mobile terminal 20 in response to the monitored splicing state. Because of having the state selection interface, when mobile terminals 20 constitute the combined terminal device 30, the function switching module in a mobile terminal 20 invokes the invocation function of the state selection interface, to present the state selection interface to the user on the display screen 10 of the mobile terminal 20 when an original physical key of the mobile terminal 20 is pressed, and the predetermined function of the physical key is presented to the user on the display screen 10 of the mobile terminal 20 in the form of a virtual key.

In an embodiment, the state determination unit is configured to, when the mobile terminal 20 enters the master operating state in response to the state determination instruction indicative of entering the master operating state, send out a state determination instruction indicative of entering the slave operating state to other mobile terminals 20, and thus, the other mobile terminals 20 automatically act as slaves, without the need for the user to set the other mobile terminals 20 one by one. Based on the same concept, in an embodiment, the display partitioning unit is configured to be triggered to run in response to the mobile terminal 20 entering the master operating state, and thus, the display content of the master is automatically displayed on a large screen composed of the individual slaves.

When the state determination unit a1 causes the mobile terminal 20 to exit the master operating state according to the state determination instruction, the state determination unit a1 sends out a slave termination instruction indicative of exiting the slave operating state to other mobile terminals 20 in response to the mobile terminal 20 exiting the master operating state, and thus, in a case in which the individual mobile terminals 20 act as slaves, upon the reception of the slave termination instruction, the displaying of the partitioned display data is terminated, and the background running tasks of the mobile terminals 20 are restored to the foreground for running. Moreover, in a case in which the mobile terminal 20 acts as a slave, when receiving the slave termination instruction, the sub-task execution unit terminates executing the sub-task. If the master loses the connection with a slave and is in a lost state, for example, the master crashes unexpectedly or is unplugged directly, the state determination unit of a mobile terminal 20 as a slave sends out the slave termination instruction indicative of exiting the slave operating state to its respective mobile terminal according to and in response to the lost state. Yet, when a slave is unplugged from the combined terminal device 30 or spliced into the combined terminal device 30, the display partitioning unit monitors the display screen resource of individual mobile terminals 20 in the combined terminal device 30 in real time, and partitions the display content of the master in real time according to the monitored display screen resource, and thus, the content of the master displayed by the combined terminal device 30 can be changed with the number of the slaves.

In an embodiment, the mobile terminal 20 further comprises a master query module, and in a case in which the mobile terminal 20 is in the splicing state, it can be determined via query by the master query module whether there is a mobile terminal 20 that operates as the master in the combined terminal device; and when there is a mobile terminal 20 that operates as the master in the combined terminal device, the master query module sends to the state determination unit a state determination instruction indicative of arranging the mobile terminal 20 to be a slave. As such, when a mobile terminal 20 is spliced into the combined terminal device 30, the mobile terminal 20 automatically acts as a slave to display the display content of the master.

Figure 2:
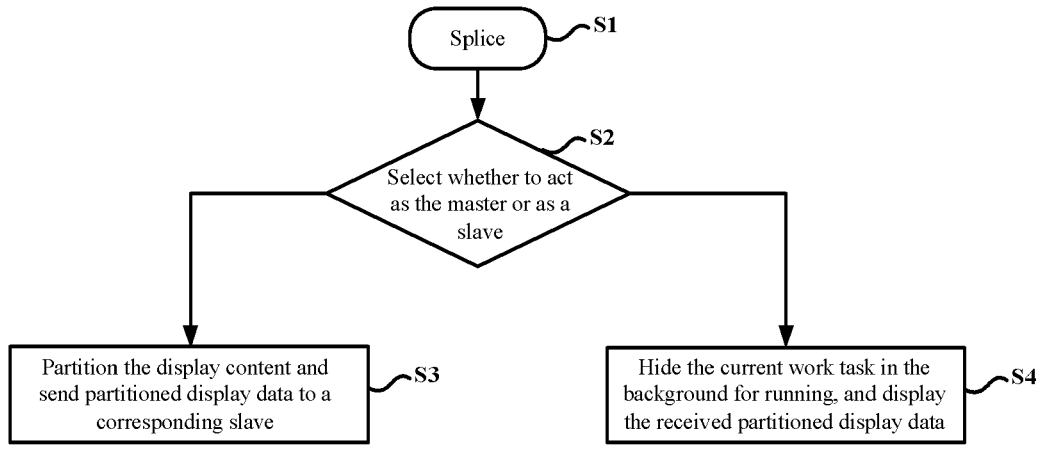
FIG. 2 is a flow chart of a method for splicing control of a mobile terminal according to an embodiment of the invention.

As shown in FIG. 2, an embodiment of the invention further provides a method for splicing control of mobile terminals, which is used for controlling splicing of a plurality of mobile terminals 20 to be combined into a single combined terminal device 30, wherein each of the mobile terminals 20 can selectively operate as a master in a master operating state and operate as a slave in a slave operating state, the splicing of each of the mobile terminals comprising the following steps:

step S1, splicing the mobile terminal 20 with a further mobile terminal 20 or a combined terminal device 30, in particular, mutually splicing the plurality of mobile terminals 20 via respective splicing interfaces for data communications to constitute the combined terminal device 30;

step S2, selecting whether the mobile terminal 20 acts as the master or a slave, in particular, causing the current mobile terminal 20 to selectively enter the master operating state or the slave operating state according to a state determination instruction inputted by a user or from other mobile terminal in the combined terminal device 30;

step S3, when operating as the master, partitioning the display content of the master according to the display screen resource in the combined terminal device 30, to obtain a plurality of pieces of partitioned display data corresponding to the plurality of the mobile terminals in the combined terminal device, and sending corresponding partitioned display data to the slaves; and step S4, in a case of acting as a slave, the mobile terminal 20 receiving the partitioned display data from the master, hiding the current work task of the mobile terminal 20 in the background for running, and displaying the received partitioned display data.

It can be seen from the above embodiments of the mobile terminal and the method for splicing control that, since the mobile terminals 20 all can be transformed between the master operating state and the slave operating state, when a mobile terminal 20 is spliced with a further mobile terminal or spliced into a combined terminal device 30, the mobile terminal 20 can select to act as the master or a slave according to a state determination instruction: when as the master, partition the display content of the master into a plurality of pieces of partitioned display data and send corresponding said partitioned display data to slaves; and when as a slave, receive the partitioned display data, hide the current work task in the background for running, and display the received partitioned display data. As such, the content displayed by the master can be displayed by slaves, and when there are a large number of slaves, the content can be displayed to the user with a relatively large screen composed of a plurality of slaves, satisfying people's demand for a large display area. It needs to be noted that when the mobile terminal 20 acts as the master, the original master in the combined terminal device 30 which is spliced therewith automatically acts as a slave of the mobile terminal 20.

The method for splicing control of the invention may further comprise: in a case in which the mobile terminal 20 acts as a slave, the resource statistics unit a4 performing statistics on its currently available resource information and sending it to the master; in a case in which the mobile terminal 20 acts as the master, the resource allocation unit a5 partitioning the current work task of the master into a plurality of sub-tasks and sending corresponding sub-tasks to individual slaves; and in a case in which the mobile terminal 20 acts as a slave, the sub-task execution unit a6 using the available resources to execute a sub-task.

In a preferred embodiment of the method for splicing control, the state selection interface of the mobile terminal 20 receives a state determination instruction inputted by a user. The splicing detection module of the mobile terminal 20 continuously monitors whether the mobile terminal 20 enters a splicing state, and the state selection interface is triggered to be presented to the user on the display screen 10 of the mobile terminal 20 in response to the mobile terminal 20 entering the splicing state.

In a preferred embodiment of the method for splicing control, the splicing interface of the mobile terminal 20 is spliced with other mobile terminals 20 for data communication between individual mobile terminals 20. When the mobile terminal 20 enters the master operating state in response to a state determination instruction indicative of entering the master operating state, the state determination unit a1 sends out a state determination instruction indicative of entering the slave operating state to other mobile terminals 20. At this time, the display partitioning unit a3 is triggered to run in response to the mobile terminal 20 entering the master operating state.

In a preferred embodiment of the method for splicing control, the state determination unit a1 causes the mobile terminal 20 to exit the master operating state according to a state determination instruction, and sends out a slave termination instruction indicative of exiting the slave operating state to other mobile terminals. In a case in which the mobile terminal 20 acts as a slave, when receiving the slave termination instruction, the display switching unit a2 terminates displaying the partitioned display data, and restores a background running task of the mobile terminal 20 to the foreground for running. In the case in which the mobile terminal 20 acts as a slave, when receiving the slave termination instruction, the sub-task execution unit a6 terminates executing the sub-task.

In a preferred embodiment of the method for splicing control, in a case in which the mobile terminal 20 is in the splicing state, the master query module of the mobile terminal 20 determines via query whether there is a mobile terminal that operates as the master in the combined terminal device 30; and when there is a mobile terminal that operates as the master in the combined terminal device 30, the master query module sends to the state determination unit the state determination instruction indicative of arranging the mobile terminal to be a slave.

Figure 3:
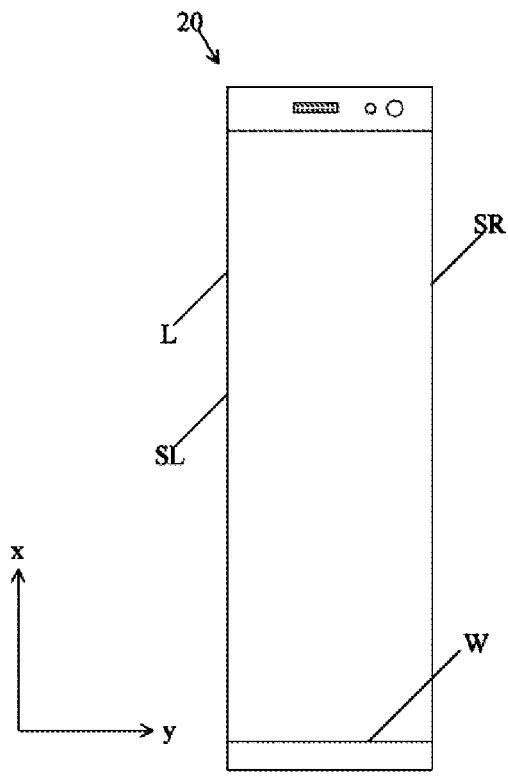
FIG. 3 is a structure diagram of a terminal device according to an embodiment of the invention.
Figure 4:
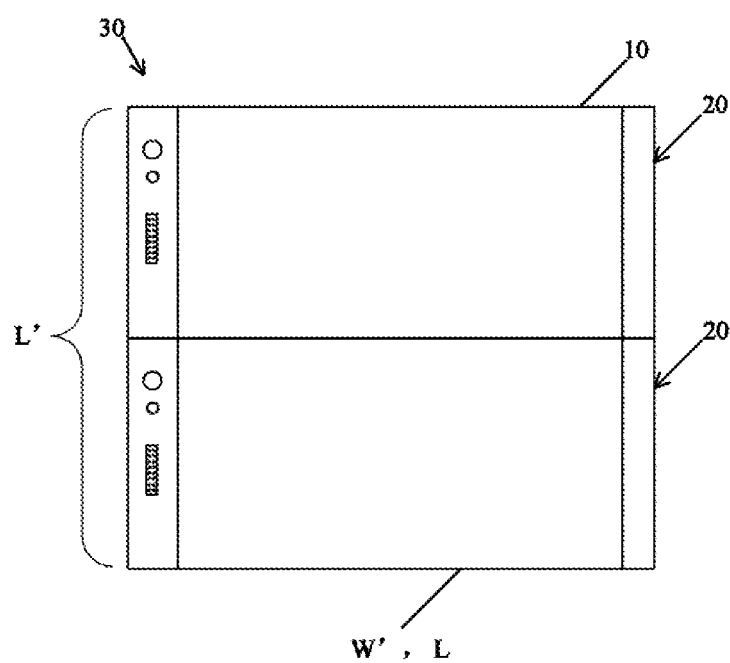
FIG. 4 is a schematic diagram of a combined terminal device according to an embodiment of the invention, wherein the number of mobile terminals is two.
Figure 5:
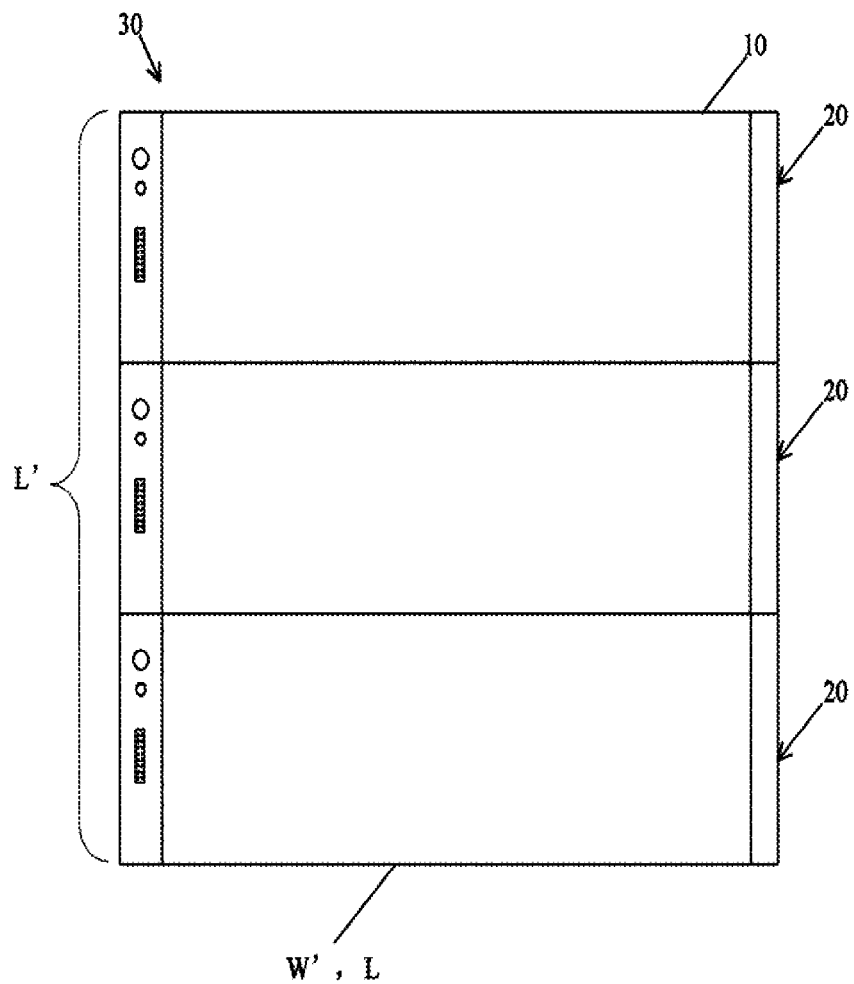
FIG. 5 is a schematic diagram of a combined terminal device according to an embodiment of the invention, wherein the number of mobile terminals is three.

As shown in FIG. 3, the mobile terminal 20 is a rectangle without rounded corners on the whole. Mobile terminals 20 of the combined terminal device 30 may be the same, or also may be different. However, the mobile terminals 20 should all comprise a display screen 10 and a first side surface SL and a second side surface SR located on two opposite sides of the display screen 10, wherein the first and second side surfaces SL, SR are planes parallel to each other. In FIG. 3, the first side surface SL and the second side surface SR are the left side surface and the right side surface, respectively; in other embodiment, the first side surface SL and the second side surface SR may also be the upper side surface and the lower side surface; and in a further embodiment, the first side surface SL and the second side surface SR may also be the left side surface and the right side surface as well as the upper side surface and the lower side surface.

A first magnetic adsorption element (not shown in the figure) is arranged at the first side surface SL and a second magnetic adsorption element (not shown in the figure) is arranged at the second side surface. The first and second adsorption elements may be iron, cobalt, nickel and a magnetic material that can attract iron, cobalt, nickel. The positions of the first and second magnetic adsorption elements are arranged such that when a further mobile terminal is spliced with the current mobile terminal, the first magnetic adsorption element at the first side surface SL of the mobile terminal and the second magnetic adsorption element at the second side surface of the further mobile terminal can attract each other, such that the first side surface of the current mobile terminal is attached to the second side surface of the further mobile terminal in alignment with each other. According to this technical solution, the first magnetic adsorption element/the second magnetic adsorption element of a mobile terminal and the second magnetic adsorption element/the first magnetic adsorption element of other mobile terminal can attract each other, to form a state in which the mobile terminals are spliced with each other. Because of the first magnetic adsorption element and the second magnetic adsorption element, a dedicated slot for splicing does not need to be arranged on a mobile terminal 20, which thus can maintain the hand feeling of using the mobile terminal. Furthermore, the first side surface SL and the second side surface SR of the display screen 10/mobile terminal 20 are parallel to each other, and therefore a mobile terminal can be attached to other mobile terminal on the side surface, and the screen of the combined terminal device 30 composed of a plurality of mobile terminals 20 is in one and the same horizontal plane, which improves the display effect and the viewing experience. In addition, the mobile terminal 20 has a splicing interface for being spliced with other mobile terminals 20 for data communication between individual mobile terminals 20.

In an embodiment of the invention, the first magnetic adsorption element does not protrude from the first side surface SL, and the second magnetic adsorption element does not protrude from the second side surface SR. This involves two situations: one in which the first magnetic adsorption element belongs to a part of the first side surface SL (or the first magnetic adsorption element is flush with the first side surface SL), the second magnetic adsorption element belongs to a part of the second side surface SR (or the second magnetic adsorption element is flush with the second side surface SR), and when splicing, the first side surface SL and the second side surface SR of different mobile terminals contact directly and attract each other, and the other in which the first magnetic adsorption element is arranged under the first side surface SL, the second magnetic adsorption element is arranged under the second side surface SR, the first magnetic adsorption element and the second magnetic adsorption element attract each other, and the first side surface SL and the second side surface SR contact each other, whereas the first magnetic adsorption element and the second magnetic adsorption element do not contact each other.

In an embodiment of the invention, the splicing interface of the mobile terminal 20 comprises a first conductive contact arranged at the first side surface and a second conductive contact arranged at the second side surface. The positions of the first and second conductive contacts are arranged such that when the first side surface of the current mobile terminal 20 is attached to the second side surface of a further mobile terminal 20 in alignment with each other, the first conductive contact at the first side surface of the mobile terminal 20 and the second conductive contact at the second side surface of the further mobile terminal 20 can electrically contact each other, and thereby charging and discharging operations and data transmission operation may be performed between different mobiles via the first conductive contact and the second conductive contact. For a single mobile terminal 20, a base matching the first conductive contact or the second conductive contact may be arranged, and the base contacts the first conductive contact or the second conductive contact to perform charging or data transmission. What calls for special attention is that when a plurality of mobile terminals 20 form a combined terminal device 30, the splicing locations between individual mobile terminals 20 attract each other due to the first magnetic adsorption element and the second magnetic adsorption element, and at this time, the first and second conductive contacts of different mobile terminals 20 can be attached closely together, ensuring the stability of charging and data transmission.

It can be known from the above description that since the first conductive contact and the second conductive contact are in direct contact, it may cause damage to the first conductive contact and the second conductive contact if they are hard connected, and therefore the invention designs at least one of the first conductive contact and the second conductive contact to be made of elastic material or biased by a spring, such that it can be moved in a direction perpendicular to the side surface where it is located to create a certain amount of movement. Due to having a certain amount of movement, it is possible that damage to the first conductive contact and the second conductive contact is prevented, while it is ensured that the first conductive contact and the second conductive contact are in contact.

Figure 8:
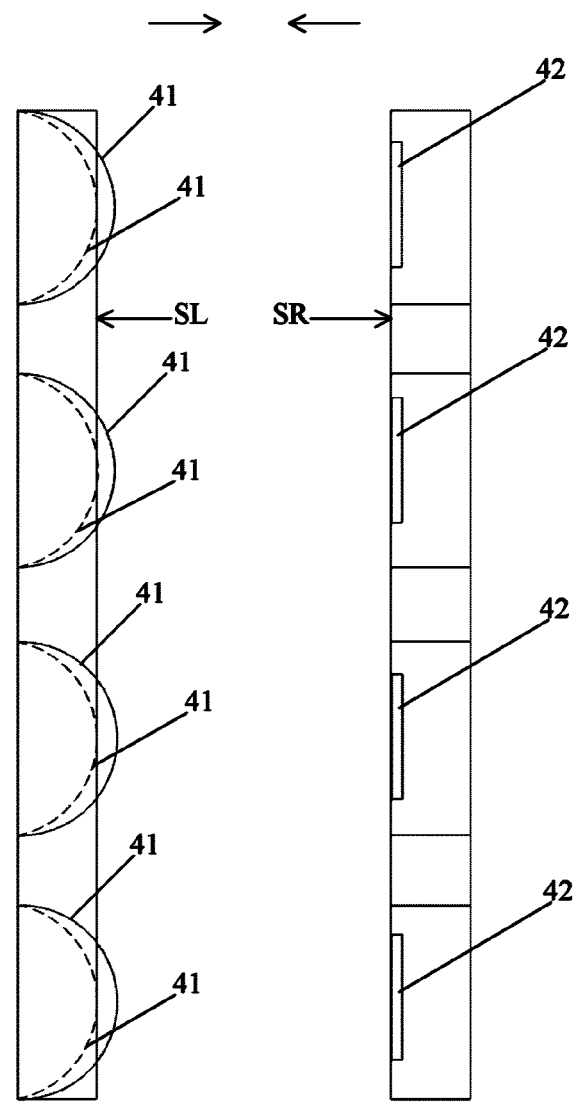
FIG. 8 is a schematic diagram of a first conductive contact and a second conductive contact in an embodiment of the invention.

As shown in FIG. 8, the invention further provides a design scheme for the first conductive contact and the second conductive contact. In FIG. 8, the first conductive contact 41 consists of a plurality of arcuate metal sheets. The second conductive contact 42 is a very thin metal sheet, of which the outer edge may be flush with the second side surface SR, but which is recessed into the second side surface SR on the whole. When the first conductive contact 41 of a mobile terminal 20 is moved toward the second conductive contact 42 of a further mobile terminal, as shown in FIG. 8, and eventually the first conductive contact 41 is made to abut the second conductive contact 42, the first conductive contact 41 made of arcuate metal sheets will deform in the direction perpendicular to the first side surface SL where it is located, such that the second side surface SR in FIG. 8 is attached to the first side surface SL in alignment with each other. In FIG. 8, the first conductive contact 41 in a solid line part denotes the first conductive contact 41 before the deformation, and the first conductive contact 41 in a dashed line part denotes the first conductive contact 41 after the deformation.

Figure 9:
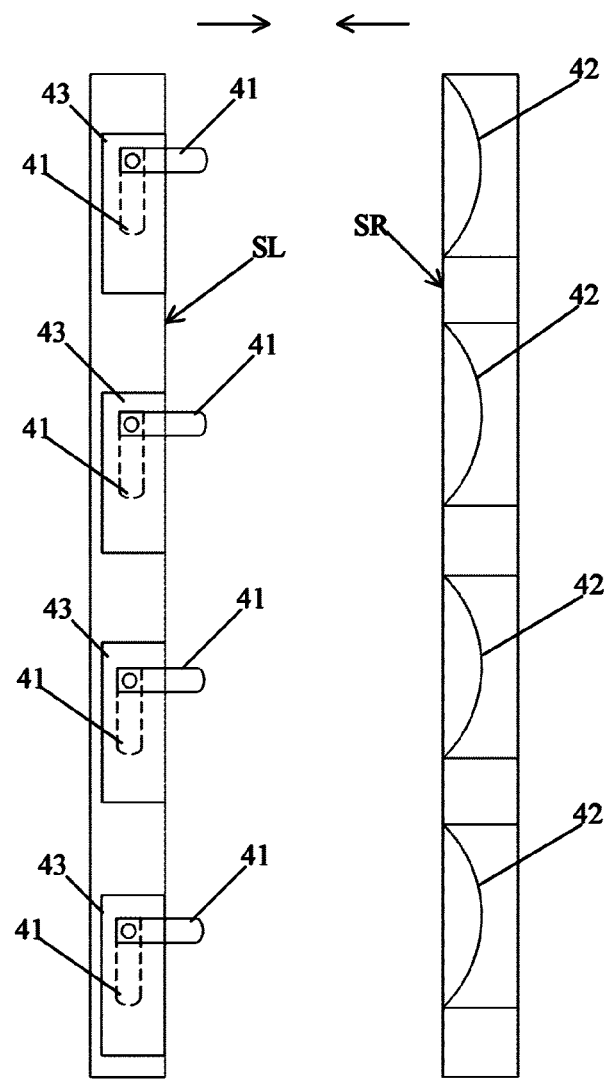
FIG. 9 is a schematic diagram of a first conductive contact and a second conductive contact in another embodiment of the invention.

As shown in FIG. 9, the invention further provides another design scheme for the first conductive contact and the second conductive contact. In FIG. 9, the first side surface SL has a first groove 43, and the first conductive contact 41 is rotatably connected into the first groove 43, for example, rotatably connected with two wall surfaces of the first groove 43 via a shaft. As shown in a solid line part in FIG. 9, the first conductive contact 41 may be rotated out of the first groove 43 to contact the second conductive contact 42 of a further mobile terminal, and the second conductive contact 42 is a structure composed of a metal leaf spring. As shown in a dashed line part in FIG. 9, the first conductive contact 41 may be rotated into the first groove 43 to disconnect the contact with the second conductive contact 42 of the further mobile terminal.

It can be seen that in the above two designs for the first conductive contact 41 and the second conductive contact 42, the first conductive contact 41 is formed as a movable contact which may be moved between an extended position and a retracted position; wherein when at the extended position, the movable contact protrudes from the side surface where it is located. In other embodiments, the second conductive contact 42 may also be arranged to be a movable contact, for example, the second conductive contact 42 in FIG. 8 and FIG. 9 may be arranged to be an arcuate metal sheet which is recessed inwardly. When the first conductive contact 41 and the second conductive contact 42 are both movable contacts, the anti-damage performance of the two can be further increased.

In the above two designs for the first conductive contact 41 and the second conductive contact 42, the side surface where the movable contact is located has a recessed portion for accommodating the movable contact, namely, the first groove 43. In other embodiments, when the first conductive contact 41 or the second conductive contact 42 which is a movable contact is extended and retracted with respect to the side surface where it is located via a manual toggle, the recessed portion is of a hole shape at this time, and the first conductive contact 41 or the second conductive contact 42 is extended or retracted through the recessed portion of a hole shape. Over the recessed portion is further arranged a contact cover, which is removably connected to the recessed portion and used for closing the recessed portion, and when the contact cover closes the recessed portion, the contact cover is flush with the side surface where it is located. The design of such a contact cover plays a role of dustproofing for a component inside the recessed portion, and since it can be flush with the side surface where it is located, also does not affect the hand feeling of using the mobile terminal 20.

As described above, the first side surface SL or the second side surface SR is used for splicing and attachment, and therefore a key of a mobile phone is not arranged on the first side surface SL or the second side surface SR as far as possible. However, if four sides of a mobile terminal 20 are to be spliced with other mobile terminals 20, a second groove may be arranged on the first side surface SL or the second side surface SR, a manual operation key is arranged in the second groove, and the contour of the manual operation key is made not to exceed the side surface where it is located. Of course, in an embodiment, the second groove may be identical to the first groove.

Figure 6:
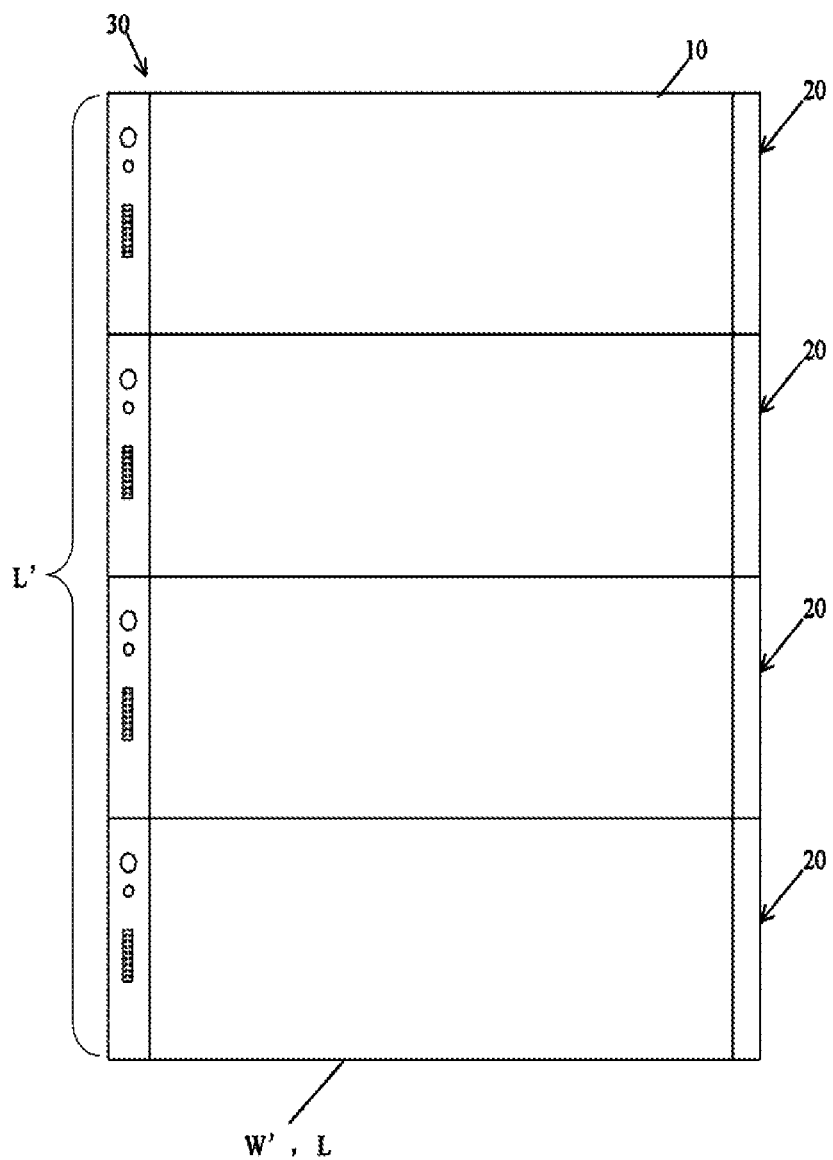
FIG. 6 is a schematic diagram of a combined terminal device according to another embodiment of the invention, wherein the number of mobile terminals is four.
Figure 7:
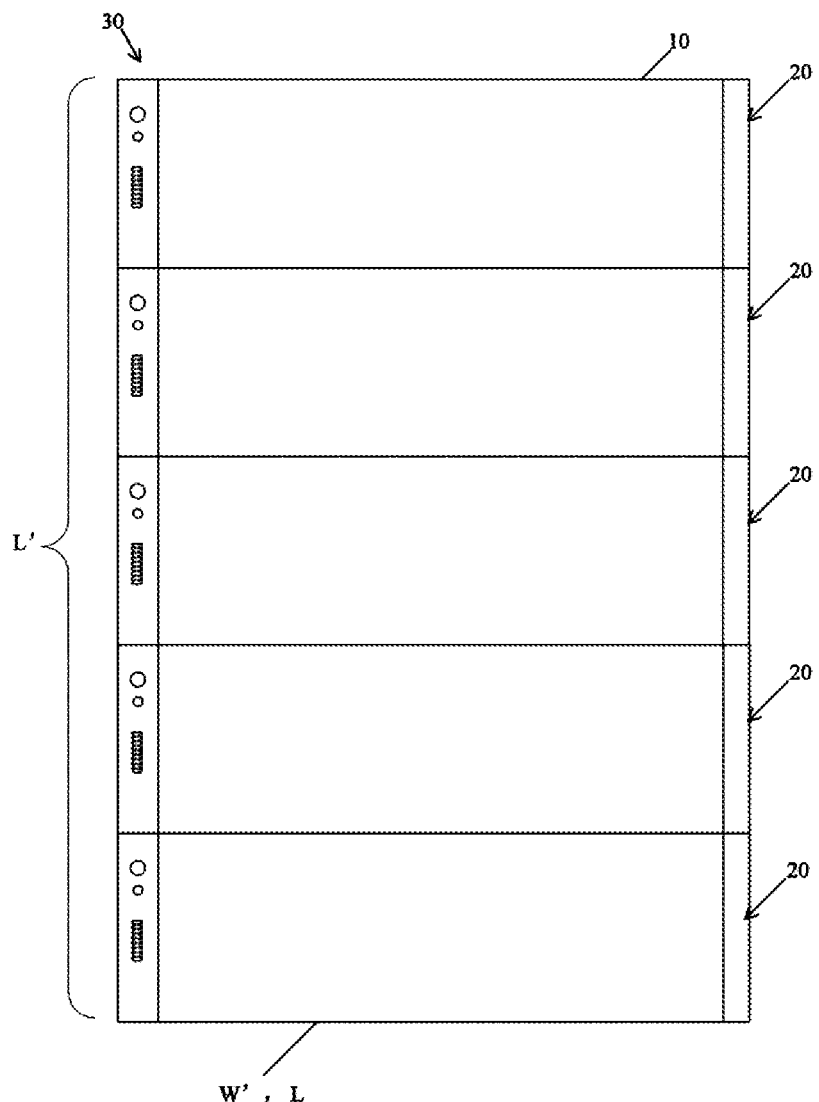
FIG. 7 is a schematic diagram of a combined terminal device according to an embodiment of the invention, wherein the number of mobile terminals is five.

FIG. 6 is a schematic diagram of a combined terminal device according to an embodiment of the invention. The combined terminal device 30 in FIG. 6 is formed by splicing four mobile terminals 20. The two long sides of the mobile terminals 20 in FIG. 6 are of a no bezel design. As shown in FIG. 7, a combined terminal device 30 provided by the invention is formed by splicing five mobile terminals 20 along the width direction of a display screen 10, and when splicing, the individual mobile terminals 20 are aligned, such that the length L of the display screen 10 acts as the width W' of the combined terminal device. In FIG. 7, the mobile terminals 20 are mobile phones, and in other embodiments, the mobile terminals 20 may also be tablets. In FIG. 6 and FIG. 7, the lengths L' and the widths W' of the combined terminal devices are 297 mm and 210 mm, respectively. That is, the width W of a mobile terminal 20 in FIG. 6 is 59.4 mm, the length L is 210 mm, and L:W=3.5; and the width W of a mobile terminal 20 in FIG. 7 is 74.25 mm, the length L is 210 mm, and L:W=2.8. When a published document is displayed by the combined terminal devices in FIGS. 6-7, not only can it be displayed without black borders on a full screen, but also the size of the font is exactly the same as that of the publication paper font at this point.

The combined terminal devices in FIGS. 6-7 may also be formed by using mobile terminals of a narrow bezel and splicing them along the width direction of the display screen 10. For example, here, a bezel, of which the width is less than 1 mm, may be defined as a narrow bezel, and of course, the width of the bezel may further be defined as needed. According to the concept of the invention, the invention preferably uses mobile terminals 20 as shown in FIG. 6 and FIG. 7 in which two sides in the width direction of the display screen 10 are designed with no bezel, which at this point can cause substantially no influence on reading at splicing positions of individual mobile terminals 20. However, with the increase of the widths of two sides in the width direction of the display screens 10, adverse influence on reading will be generated gradually. In particular, in an embodiment, the display screen of the master in the combined terminal 30 provides a virtual keyboard and a virtual touchpad (virtual slide control panel) acting as an input interface of the combined terminal device, for example, text information can be inputted via the input interface. In another embodiment, the whole display screen of the combined terminal device 30 provides a unified virtual keyboard and a virtual touchpad, and the unified virtual keyboard is used as the input interface of the combined terminal device 30. Of course, it may also be possible for the display screens of a part of the mobile terminals 20 which constitute the combined terminal device 30 to provide a virtual keyboard, the part of the mobile terminals may be the master and slaves or may all be slaves, and such a virtual keyboard has a large display area, which greatly improves the comfort of using the combined terminal device 30. It needs to be particularly noted that when the input screen of the combined terminal device 30 of the invention and the display screen of the combined terminal device 30 each are separate screens, the both may be connected in a wired or wireless manner, there is an angle of e.g. 90 degrees or so between the input screen and the display screen, and as such, the combined terminal device 30 resembles a notebook computer on the whole.

In the above combined terminal device 30, the resource statistics unit performs statistics on speakers that the master and the slaves have, and the left channel of the audio of the combined terminal device is allocated to individual speakers located on the left side, the right channel of the audio is allocated to individual speakers located on the right side, and the middle channel of the audio is allocated to individual speakers in the middle, to form a stereo speaker system.

In an embodiment of the combined terminal device 30 of the invention, the state selection interface is configured to be triggered to be presented to the user on the display screen of the combined terminal device 30 in response to the mobile terminal 20 entering the splicing state. By such an arrangement, the state selection interface is only displayed on the display screen of the original combined terminal device 30 and a newly spliced mobile terminal 20. In another embodiment, upon a physical key of an individual mobile terminal being pressed, in response to the pressing, the state selection interface is triggered to be presented to the user on the display screen of a mobile terminal to which the physical key belongs, and in response to the pressing, the function of the physical key is presented to the user in the form of a virtual key on the display screen of the mobile terminal to which the physical key belongs, for example, the physical key may be the HOME key on an Apple phone. When a plurality of mobile phones of this kind are spliced, the state selection interface may be automatically displayed to the user for selecting whether a mobile terminal 20 acts as the master or a slave, or, only when the HOME key is pressed, the user is allowed to select or change whether a mobile terminal 20 acts as the master or a slave.

Referring back to FIG. 3, in the width direction of the display screen 10, two oppositely arranged sides of the mobile terminal 20 are arranged in a form of no bezel. In FIG. 3, the x direction is the length direction of the display screen, and the y direction is the width direction of the display screen. It can be seen from FIGS. 3-7 that the display screen 10 is basically rectangular. The display screen 10 may be arranged such that L:W≥2.5, wherein L is the length of the display screen and W is the width of the display screen. Therefore, in some embodiments of the invention, the display screen 10 is elongated in shape. Thus, with the same width, the display screen 10 has a larger display area. Or, in other words, with the same display area, the display screen 10 of such a kind may have a smaller width to facilitate a one-hand operation by people. Moreover, while it is easy for a user of a mobile phone to operate by one hand, a corresponding ratio of a sheet of A4 paper is easier to realize by a plurality of display screens in a single row splicing manner.

According to an embodiment of the invention, the aspect ratio of the rectangular display screen may be restricted to $$L:W=(205\sim215):[(290\sim304)/n], \quad (1)$$

wherein n is a positive integer and n≥2. By such an arrangement, when a combined terminal device 30 is formed by splicing n mobile terminals 20, the aspect ratio of the combined terminal device 30 is (290~304)/(205~215), that is to say, the aspect ratio of the display area of the combined terminal device 30 formed by splicing mobile terminals 20 is substantially equal to 297:210, such that the display screen 10 can display a published document without black borders on a full screen regardless of the size of the font.

In a preferred embodiment of the invention, n is set to be less than or equal to 6. And when n takes a value of 4 or 5, not only can the display screen 10 be made to have a relatively large display area, but also the display screen 10 is not made to be too elongated so as to affect the use of the mobile terminal 20. In a preferred embodiment of the invention, W is 58~61 mm, and L is 205~215 mm, and especially when W is 60 mm and L is 210 mm, five mobile terminals 20 may constitute a combined terminal device 30, of which the aspect ratio is substantially 297:210. When W is 72~76 mm and L is 205~215 mm, and especially when W is 74 mm and L is 210 mm, four mobile terminals 20 may constitute a combined terminal device 30, of which the aspect ratio is substantially 297:210. While having a relatively large display area, the display screen 10 and the mobile terminal 20 according to the invention is further particularly suitable for one-hand operations. And for a combined terminal device 30 formed by splicing a plurality of the mobile terminals 20, its aspect ratio is substantially equal to 297:210, and thereby it can display a published document without black borders on a full screen.

It needs to be understood that the restriction condition for the aspect ratio of the display screen of a mobile terminal described above in the formula (1) may not be limited to a relatively elongated display screen (e.g., a display screen of which the aspect ratio is not less than 2.5), but may act as an independent restriction condition. For example, for the formula (1), n therein may take a value of 2 or 3. At this point, the aspect ratio is roughly 1.41 and 2.12, respectively. Although at this point a single display screen does not look so elongated, it is still in favor of being spliced into a display screen of the ratio of a sheet of A4 paper. Especially, when two or three such display screens are used to be spliced into a display screen of a size substantially the same as the actual size of a sheet of A4 paper, the length L of the display screen may be 205~215 mm.

Further, it needs to be understood that purely for the convenience of being spliced into a display screen of a size substantially the same as the actual size of a sheet of A4 paper, the display screens of the mobile terminals may be rectangular, and the lengths or widths thereof are 205~215 mm. When a combined terminal device 30 is formed by splicing a plurality of mobile terminals in a single row, the lengths or widths of these mobile terminals have the same size and take a value between 205~215 mm. Thus, when these mobile terminals are aligned and spliced along the lengths or widths of the same size, the formed single rectangular screen acts as the display screen of the combined terminal device 30, and the single rectangular screen has a width of 205~215 mm on the whole. The length of the single rectangular screen formed by splicing may be 290~304 mm, which may be achieved by selecting the number of mobile terminals that participate in splicing, or by selecting the length of another side of the mobile terminal of a different size. Typically, the combined terminal device 30 may be formed by combining a mobile phone and a tablet, or formed by combining a mobile phone and two tablets.

Figure 10:
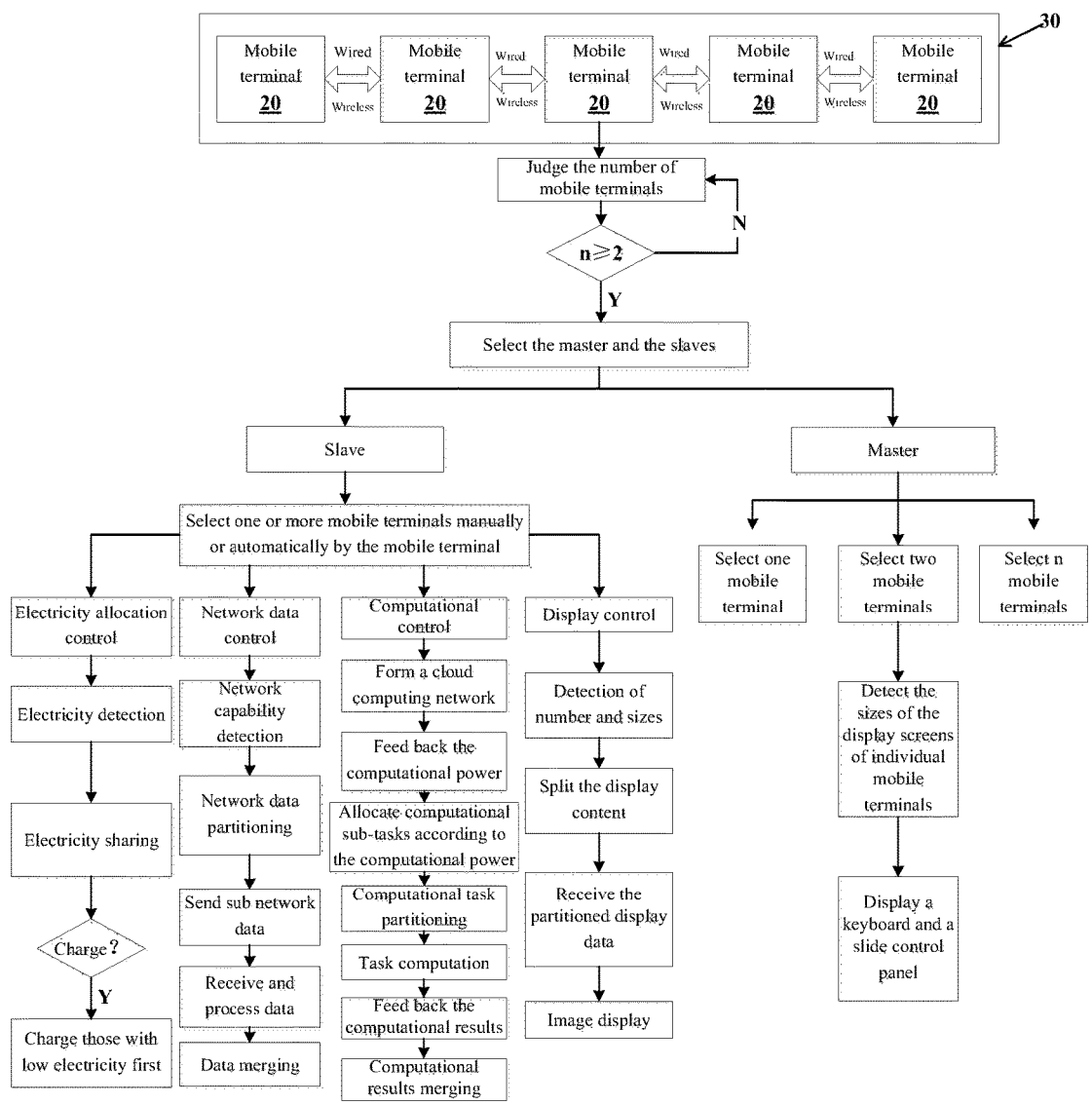
FIG. 10 is a flow chart of a method for splicing control of a mobile terminal according to another embodiment of the invention.

In the following, it will be described in connection with FIG. 10 how to splice mobile terminals 20 as shown in FIG. 3 into a combined terminal device 30 as shown in FIG. 7. Structurally, each of the mobile terminals 20 has a first side surface SL and a second side surface SR located on two opposite sides of the display screen 10, and in FIG. 3, the first side surface SL is the left side surface, and the second side surface SR is the right side surface. Both of the first side surface SL and the second side surface SR have a splicing interface for being spliced with other mobile terminal, and the splicing interface has a first and a second conductive contacts. When five mobile terminals 20 are spliced as shown in FIG. 7, except the outermost edges, the first conductive contact and the second conductive contact of a further mobile terminal are in electrical contact with each other, the second conductive contact and the first conductive contact of a still further mobile terminal are in electrical contact with each other, and such a contact is a wired connection. In a further embodiment, individual mobile terminals 20 may also be in a wireless manner as shown in FIG. 7. After the splicing is finished, the mobile terminals 20 each will detect the number of mobile terminals. As shown in FIG. 10, when the number of mobile terminals 20 is greater than or equal to 2, a menu which is to be clicked by the user will be displayed on an individual mobile terminal 20, and if the user clicks the menu, the mobile terminal 20 can be arranged to be the master, and other mobile terminals are automatically arranged to be slaves. In a further embodiment, it may also be arranged such that when a new mobile terminal 20 is spliced into an existing combined terminal device 30, the mobile terminal 20 detects that there is already a master and automatically arranges itself to be a slave. First, as shown in FIG. 10, it may be possible to select two mobile terminals 20, detect the sizes of the respective display screens of the two mobile terminals 20, and take the display screens of the two mobile terminals 20 as a whole to display a virtual keyboard and a virtual slide control panel for controlling the input of the master. Of course, it may also be possible to select fewer, e.g., only one mobile terminal 20 to display the virtual keyboard and the virtual slide control panel, or, when there are a few mobile terminals and/or the respective display screens are small, all of the mobile terminals may be made to display the virtual keyboard and the virtual slide control panel. For the slaves, the master can perform electricity allocation control. By electricity detection, the master obtains the electricity resource of the slaves, and if the electricity of the master or a certain slave is insufficient, the master generates a charging task, which is used for electricity sharing. The master allocates the charging task to a slave or the master with sufficient electricity, such that the slave or the master with sufficient electricity charges the master or the slave with insufficient electricity. In another embodiment, the resource allocation unit of the master may further partition the charging task into charging sub-tasks and send a corresponding charging sub-task to other slave or the master according to the electricity resource, and according to the received charging sub-task, the sub-task execution unit in the slave or the master uses the charge resource in the slave or the master to charge the master or the slave with insufficient electricity, and of course, it is necessary to charge a mobile terminal with relatively low electricity first. For the slaves, the master can perform network data control. By network capability detection, the master obtains the network resource of the slaves, the resource allocation unit in the master partitions the upload or download task of the master, that is, partitions the network data uploaded or downloaded by the master to form sub network data, the slaves receive the sub network data and perform receiving and processing of data, and the master merges the data received and processed by the individual slaves to complete the upload or download task. For the slaves, the master can perform computational control. First, the combined terminal device 30 formed by splicing forms a cloud computing network via the above mentioned wired or wireless connection, the master obtains the CPU resource of the individual slaves and thereby obtains the computational power of the individual slaves, the resource allocation unit in the master partitions the computational task of the master into computational sub-tasks and sends a corresponding computational sub-task to a slave according to the computational power of the slave, the sub-task execution unit in the slave uses the CPU resource of the slave to execute the computational sub-task according to the received computational sub-task and feeds the computational result back to the master after the computation is finished, and the master merges the obtained individual computational results to generate a final computational result. For the slaves, the master can perform display control as shown in FIG. 7, in which the spliced combined terminal device 30 displays the display content of the master. By detecting the number of slaves for displaying the display content of the master and the sizes of the respective display screens, the display content of the master is split according to the number and sizes of slaves to obtain partitioned display data, and each slave receives partitioned display data and performs image display individually.

So far, it shall be recognized by those skilled in the art that although multiple exemplary embodiments of the invention have already been illustrated and described in detail in this context, many other variations or modifications in line with the principles of the invention may still be directly determined or deduced according to the content disclosed in the invention, without departing from the spirit and scope of the invention. Therefore, the scope of the invention should be understood and deemed to cover all the other variations or modifications.

The invention claimed is:

1. A splicable mobile terminal, a plurality of the mobile terminals being capable of being spliced to be combined into a single combined terminal device, wherein each of the mobile terminals can selectively operate as a master in a master operating state and operate as a slave in a slave operating state, each of the mobile terminals comprises a display screen;

a state selection interface for receiving a state determination instruction inputted by a user;
one or more physical keys, each of which is used for implementing a predetermined function;
a memory having instructions stored thereon;
a processor configured to execute the instructions to perform operations of splicing management, comprising:
causing the mobile terminal to selectively enter the master operating state or the slave operating state according to the state determination instruction;
when the mobile terminal operates as the master, partitioning the display content of the master according to the display screen resource of individual said mobile terminals in the combined terminal device, to obtain a plurality of pieces of partitioned display data corresponding to the plurality of the mobile terminals in the combined terminal device, and sending corresponding said partitioned display data to the slaves; and in a case in which the mobile terminal acts as the slave, upon reception of the partitioned display data from the master, hiding the current work task of the mobile terminal in the background for running, and displaying the received partitioned display data; and the processor further configured to execute the instructions to perform operations of function switching, comprising:

switching the predetermined function of one specified physical key of the one or more physical keys into an invocation function for invoking the state selection interface, and presenting on the display screen a virtual key for implementing the predetermined function of the specified physical key;

wherein, when the specified physical key is pressed, the state selection interface is triggered to be presented to the user on the display screen of the mobile terminal in response to the pressing operation.

2. The mobile terminal as claimed in claim 1, wherein the operations of splicing management further comprise:

performing statistics on currently available resource information of the mobile terminal and sending the available resource information to the master, in a case in which the mobile terminal acts as the slave;

portioning the current work task of the master into a plurality of sub-tasks according to the available resource information of the slaves and sending corresponding sub-tasks to the slaves, in a case in which the mobile terminal operates as the master; and executing the sub-task using the available resource according to the sub-task from the master, in a case in which the mobile terminal acts as the slave.

3. The mobile terminal as claimed in claim 2, wherein the operation of causing the mobile terminal to selectively enter the master operating state or the slave operating state according to the state determination instruction further comprises: causing the mobile terminal to exit the master operating state according to the state determination instruction, and sending out a slave termination instruction indicative of exiting the slave operating state to other mobile terminals in response to the mobile terminal exiting the master operating state.

4. The mobile terminal as claimed in claim 3, wherein the operation of hiding the current work task of the mobile terminal in the background for running and displaying the received partitioned display data further comprises: in a case in which the mobile terminal acts as the slave, when receiving the slave termination instruction, terminating displaying the partitioned display data, and restoring a background running task of the mobile terminal to the foreground for running.

5. The mobile terminal as claimed in claim 3, wherein the operation of executing the sub-task using the available resource according to the sub-task from the master further comprises: in a case in which the mobile terminal acts as the slave, when receiving the slave termination instruction, terminating executing the sub-task.

6. The mobile terminal as claimed in claim 2, wherein the available resource information comprises at least one of the CPU resource, the storage resource, the network resource and the electricity resource.

7. The mobile terminal as claimed in claim 6, wherein the operation of partitioning the current work task of the master into a plurality of sub-tasks according to the available resource information of the slaves and sending corresponding sub-tasks to the slaves further comprises: partitioning the computational task of the master into computational sub-tasks, and sending a corresponding computational sub-task to the slave according to the CPU resource of the slave; and the operation of executing the sub-task using the available resource according to the sub-task from the master further comprises: using the CPU resource of the slave to execute the computational sub-task according to the received computational sub-task; or the operation of partitioning the current work task of the master into a plurality of sub-tasks according to the available resource information of the slaves and sending corresponding sub-tasks to the slaves further comprises: partitioning the storage task of the master into storage sub-tasks, and sending a corresponding storage sub-task to the slave according to the storage resource of the slave; and the operation of executing the sub-task using the available resource according to the sub-task from the master further comprises: using the storage resource of the slave to execute the storage sub-task according to the received storage sub-task; or the operation of partitioning the current work task of the master into a plurality of sub-tasks according to the available resource information of the slaves and sending corresponding sub-tasks to the slaves further comprises: partitioning the upload or download task of the master into upload or download sub-tasks, and sending a corresponding upload or download sub-task to the slave according to the network resource of the slave; and the operation of executing the sub-task using the available resource according to the sub-task from the master further comprises: using the network resource of the slave to execute the upload or download sub-task according to the received upload or download sub-task; or the operation of partitioning the current work task of the master into a plurality of sub-tasks according to the available resource information of the slaves and sending corresponding sub-tasks to the slaves further comprises: obtaining the electricity resource of the slaves, and if the electricity of the master or a certain said slave is insufficient, generating a charging task, and allocating the charging task to one said slave or the master with sufficient electricity, such that the slave or the master with sufficient electricity charges the master or the slave with insufficient electricity, partitioning the charging task into charging sub-tasks and sending a corresponding charging sub-task to other said slave or the master according to the electricity resource; and the operation of executing the sub-task using the available resource according to the sub-task from the master further comprises: according to the received charging sub-task, using the charging resource in the slave or the master to charge the master or the slave with insufficient electricity.

8. The mobile terminal as claimed in claim 2, wherein the operations of splicing management further comprise: performing statistics on speakers that the master and the slaves have; and allocating the left channel of the audio of the combined terminal device to individual said speakers located on the left side, allocating the right channel of the audio to individual said speakers located on the right side, and allocating the middle channel of the audio to individual said speakers in the middle, to form a stereo speaker system.

9. The mobile terminal as claimed in claim 1, further comprising:

a splicing interface for being spliced with other said mobile terminals for data communication between individual said mobile terminals.

10. The mobile terminal as claimed in claim 9, further comprising:
a first side surface and a second side surface located on two opposite sides of the display screen, wherein the first and second side surfaces are planes parallel to each other;
a first magnetic adsorption element arranged at the first side surface and a second magnetic adsorption element arranged at the second side surface; wherein the positions of the first and second magnetic adsorption elements are arranged such that when a further said mobile terminal is spliced with the current said mobile terminal, the first magnetic adsorption element at the first side surface of the current said mobile terminal and the second magnetic adsorption element at the second side surface of the further said mobile terminal can attract each other, such that the first side surface of the current said mobile terminal is attached to the second side surface of the further said mobile terminal in alignment with each other;
wherein the first magnetic adsorption element does not protrude from the first side surface, and the second magnetic adsorption element does not protrude from the second side surface.

11. The mobile terminal as claimed in claim 10, wherein the splicing interface comprises:
a first conductive contact arranged at the first side surface, and
a second conductive contact arranged at the second side surface;
the positions of the first and second conductive contacts are arranged such that when the first side surface of the current said mobile terminal is attached to the second side surface of the further said mobile terminal in alignment with each other, the first conductive contact at the first side surface of the current said mobile terminal and the second conductive contact at the second side surface of the further said mobile terminal can electrically contact each other.

12. The mobile terminal as claimed in claim 11, wherein at least one of the first conductive contact and the second conductive contact is made of elastic material or is biased by a spring, such that it can be moved in a direction perpendicular to the side surface where it is located.

13. The mobile terminal as claimed in claim 12, wherein the first conductive contact consists of a plurality of arcuate metal sheets, and the second conductive contact is recessed into the second side surface; and the first conductive contact of the current said mobile terminal and the second conductive contact of the further said mobile terminal abut each other, in order that by the first conductive contact deforming in the direction perpendicular to the side surface where it is located, the second side surface of the further said mobile terminal is caused to be attached to the first side surface of the current said mobile terminal in alignment with each other; or
the first side surface has a first groove, and the first conductive contact is rotatably connected into the first groove; and the first conductive contact may be rotated out of the first groove to contact the second conductive contact of the further said mobile terminal, and the first conductive contact may be rotated into the first groove to disconnect the contact with the second conductive contact of the further said mobile terminal.

14. The mobile terminal as claimed in claim 11, wherein at least one of the first conductive contact and the second conductive contact is formed as a movable contact which may be moved between an extended position and a retracted position; wherein when at the extended position, the movable contact protrudes from the side surface where it is located;
wherein the side surface where the movable contact is located has a recessed portion for accommodating the movable contact.

15. The mobile terminal as claimed in claim 10, further comprising:
a manual operation key arranged at the first side surface and/or the second side surface, wherein the manual operation key is formed in a second groove of the side surface where it is located, such that the contour of the manual operation key does not exceed the side surface where it is located.

16. The mobile terminal as claimed in claim 10, wherein the mobile terminal is a rectangle without rounded corners on the whole.

17. The mobile terminal as claimed in claim 10, wherein on the back side of the mobile terminal are disposed a left magnetic adsorption element and a right magnetic adsorption element arranged along the width direction of the display screen, and the positions of the left and right magnetic adsorption elements are arranged such that when a further said mobile terminal abuts the current said mobile terminal back to back, the left magnetic adsorption element and the right magnetic adsorption element of the current said mobile terminal and the left magnetic adsorption element and the right magnetic adsorption element of the further said mobile terminal can attract each other, respectively, such that the back of the current said mobile terminal is attached to the back of the further said mobile terminal in alignment with each other.

18. The mobile terminal as claimed in claim 1, wherein the processor is further configured to execute the instructions to perform operations of splicing detection, comprising:
continuously monitoring whether the mobile terminal enters a splicing state;
wherein the state selection interface is configured to be triggered to be presented to the user on the display screen of the mobile terminal in response to the mobile terminal entering the splicing state.

19. The mobile terminal as claimed in claim 1, wherein the operation of causing the mobile terminal to selectively enter the master operating state or the slave operating state according to the state determination instruction further comprises: when the mobile terminal enters the master operating state in response to the state determination instruction indicative of entering the master operating state, sending out the state determination instruction indicative of entering the slave operating state to other mobile terminals.

20. The mobile terminal as claimed in claim 19, wherein the processor is further configured to be triggered to perform the operation of partitioning the display content of the master according to the display screen resource of individual said mobile terminals in the combined terminal device, to obtain a plurality of pieces of partitioned display data corresponding to the plurality of the mobile terminals in the combined terminal device, and sending corresponding said partitioned display data to the slaves, in response to the mobile terminal entering the master operating state.

21. The mobile terminal as claimed in claim 1, wherein the operation of causing the mobile terminal to selectively enter the master operating state or the slave operating state according to the state determination instruction further comprises: in a case in which the mobile terminal acts as the slave, when the mobile terminal loses the connection with the master and is in a lost state, sending out a slave termination instruction indicative of exiting the slave operating state according to and in response to the lost state.

22. The mobile terminal as claimed in claim 1, wherein the operation of partitioning the display content of the master according to the display screen resource of individual said mobile terminals in the combined terminal device further comprises monitoring the display screen resource of individual said mobile terminals in the combined terminal device in real time, and partitioning the display content of the master in real time according to the monitored display screen resource.

23. The mobile terminal as claimed in claim 1, wherein the processor is further configured to execute the instructions to perform operations of master query, comprising:

in a case in which the mobile terminal is in the splicing state, determining via query whether there is said mobile terminal that operates as the master in the combined terminal device; and when there is said mobile terminal that operates as the master in the combined terminal device, sending to the state determination unit the state determination instruction indicative of arranging the mobile terminal to be the slave.

24. The mobile terminal as claimed in claim 1, wherein the display screen is basically rectangular and arranged such that L:W=(205~215):[(290~304)/n], wherein L is the length of the display screen and W is the width of the display screen;

wherein n is a positive integer and n≥2; preferably L:W≥2.5.

25. The mobile terminal as claimed in claim 1, wherein in the width/length direction of the display screen, two oppositely arranged sides of the mobile terminal are arranged in a form of no bezel or a narrow bezel, wherein the width of the narrow bezel is less than 1 mm.

26. The mobile terminal as claimed in claim 1, wherein the display content comprises a virtual input device; and the operation of partitioning the display content of the master according to the display screen resource of individual said mobile terminals in the combined terminal device further comprises partitioning the display data corresponding to the virtual input device into at least one piece of partitioned display data on the whole.

27. A combined terminal device, which is formed by splicing N mobile terminals as claimed in claim 1 in the width direction and/or the length direction of the display screen, and is such that the display screens of the N mobile terminals form a single rectangular screen as a whole to be used as the display screen of the combined terminal device.

28. A combined terminal device, which is formed by splicing N mobile terminals as claimed in claim 1 in the width direction and/or the length direction of the display screen, and is such that the display screens of M of the mobile terminals form a single rectangular screen as a whole to be used as the display screen of the combined terminal device, the display screens of N−M of the mobile terminals form a single rectangular screen as a whole to act as an input screen for displaying a virtual input device, and the input screen is used for providing a virtual keyboard and a virtual touchpad acting as input interfaces of the combined terminal device, wherein N>M.

\* \* \* \* \*